United States Patent
Schmid (10) Patent No.: US 10,566,744 B1
(45) Date of Patent: Feb. 18, 2020

(54) PLUG PROTECTION DEVICE AND SENSOR ARRANGEMENT WITH SUCH A PLUG PROTECTION DEVICE

(71) Applicant: KraussMaffei Technologies GmbH, München (DE)

(72) Inventor: Christian Schmid, Egling (DE)

(73) Assignee: KRAUSSMAFFEI TECHNOLOGIES GMBH, München (DE)

( * ) Notice: Subject to any disclaimer, the term of this patent is extended or adjusted under 35 U.S.C. 154(b) by 0 days.

(21) Appl. No.: 16/534,141

(22) Filed: Aug. 7, 2019

(30) Foreign Application Priority Data

Sep. 7, 2018 (DE) .................. 10 2018 121 850

(51) Int. Cl.
*G01D 11/24* (2006.01)
*H01R 13/66* (2006.01)
*H01R 13/53* (2006.01)

(52) U.S. Cl.
CPC ....... *H01R 13/6683* (2013.01); *G01D 11/245* (2013.01); *H01R 13/53* (2013.01)

(58) Field of Classification Search
CPC ... H01R 13/6683; H01R 13/53; G01D 11/245
See application file for complete search history.

(56) References Cited

U.S. PATENT DOCUMENTS

2013/0169388 A1* 7/2013 LaFountain .............. H01H 9/04
335/205

FOREIGN PATENT DOCUMENTS

| DE | 4108886 C1 | * | 3/1992 | ......... H01R 13/6683 |
| DE | 102007062830 A1 | * | 6/2009 | ............. B21D 15/04 |
| DE | 102013200775 A1 | * | 7/2014 | ........... G01D 11/245 |
| DE | 102013200775 A1 | | 7/2014 | |
| EP | 2905798 B1 | | 9/2016 | |

* cited by examiner

*Primary Examiner* — Jamel E Williams
(74) *Attorney, Agent, or Firm* — Pearne & Gordon LLP (57) ABSTRACT

A plug protection device (1) has an annular holding section (2), which has an inner surface wall (3), which delimits a through-opening (4) of the annular holding section (2) and which, with regard to its shape, is adapted to an outer surface wall (5) of a shoulder (6) of a sensor housing (7) of the sensor (8) in such a way that the annular holding section (2) of the plug protection device (1) is able to be mounted in a form-fitting manner onto the shoulder (6) of the sensor housing (7), and having at least one protection lug (9.1, 9.2, 9.3) connected with the annular holding section (2), which extends away from a face side of the annular holding section (2), which in a mounted arrangement of the plug protection device (1) on the shoulder (6) of the sensor housing (7) faces an electric connection socket (11) of the sensor (8) configured for the contacting reception of an electric plug (10), in such a way that the protection lug (9.1, 9.2, 9.3) extends in an insertion direction (R), so that in a mounted arrangement of the plug protection device (1) onto the shoulder (6) of the sensor housing (7) of the sensor (8), in which also the electric plug (10) is inserted into the electric connection socket (11) of the sensor (8), the electric plug (10) is mechanically limited on at least one side of the electric plug (10) by the at least one protection lug (9.1, 9.2, 9.3). A sensor arrangement with such a plug protection device (1) is also provided.

12 Claims, 5 Drawing Sheets

PLUG PROTECTION DEVICE AND SENSOR ARRANGEMENT WITH SUCH A PLUG PROTECTION DEVICE

CROSS-REFERENCE TO RELATED APPLICATIONS

This application claims priority from German Patent Application No. DE 102018121850.8 filed on Sep. 7, 2018. The content of this application is incorporated herein by reference in its entirety.

FIELD OF THE INVENTION

The invention relates to a plug protection device and a sensor arrangement with such a plug protection device.

BACKGROUND OF THE INVENTION

From DE 10 2013 200 775 A1 a proximity switch with a plug connection for a round plug is known. A most frequent structural shape of such proximity switches is cylindrical with a metric external thread. The electrical connection takes place via a cable and a plug connected thereto, which is inserted into the plug connection of the proximity switch. Despite relatively high costs and a relatively large space requirement, sensors, in particular proximity switches with plug connections are widespread.

EP 2 905 798 A1 discloses, for example, a proximity switch as representative example of a sensor, in which, however, an electrical line is connected directly to the receiver of the sensor, i.e. the proximity switch is formed without a connection socket, but has a handling section.

BRIEF SUMMARY OF THE INVENTION

It is an object of the invention to provide a plug protection device and a sensor arrangement with such a plug protection device, whereby electrical plugs which are plugged to sensors can be protected from mechanical damage with little structural effort and by simple mounting provisions.

The problem is solved by a plug protection device having an annular holding section which has an inner surface wall which delimits a through-opening of the annular holding section and which is adapted, with regard to its shape, to an outer surface wall of a shoulder of a sensor housing of a sensor, in such a way that the annular holding section of the plug protection device is able to be placed onto the shoulder of the sensor housing in a form-fitting manner, and having at least one protection lug, connected with the annular holding section, which protection lug extends away from a face side of the annular holding section which, in a mounted arrangement of the plug protection device on the shoulder of the sensor housing faces an electrical connection socket of the sensor, formed for the contacting reception of an electric plug, in such a way that the protection lug extends in an insertion direction, so that in a mounted arrangement of the plug protection device onto the shoulder of the sensor housing of the sensor, in which the electric plug is also inserted into the electric connection socket of the sensor, the electric plug is limited mechanically on at least one side of the electric plug by the at least one protection lug.

The plug protection device serves for the mechanical protection of sensors. The sensors can be proximity switches. Such proximity switches generally serve to detect the position of a movable component on devices, machines and/or equipment. Thus, the component can be, for example, an actuator which actuates a switch or a valve. For this, the proximity switches can be configured to detect a switch position or a valve position. Thus, such a proximity switch can detect for example an on position and/or an off position, and can emit it as an electrical, in particular digital, signal. The proximity switch can have a first illuminant, in particular a first LED, which illuminates when the proximity switch is supplied with electrical energy, i.e. is electrically connected. The proximity switch can have a second illuminant, in particular a second LED, which illuminates when the proximity switch detects an on position, and does not illuminate when the proximity switch detects an off position.

The at least one protection lug of the plug protection device forms a stop body in the spatial proximity of the sensor, so that in the event of a collision, the collision body does not strike the sensor directly, but rather only the protection lug. The collision forces are in this respect at least largely or completely received by the at least one protection lug, and are not or are at least predominantly not passed on to the sensor. Depending on the embodiment, the plug protection device can have a single protection lug, two protection lugs, three protection lugs or several protection lugs. The at least one protection lug can be connected in particular in one piece with the annular holding section. The plug protection device can be produced in one piece, for example from metal or plastic, in particular from fibre-reinforced, in particular glass fibre-reinforced, plastic.

The annular holding section defines the through-opening through which the housing of the sensor, which is to be protected, projects. In this respect, the plug protection device is mounted directly on the sensor. By the plug protection device being mounted directly on the sensor, complex fastening sections, bores, stud bolts, flange plates etc. can be dispensed with on housings of the devices, machines and/or equipment which are to be fitted with the sensor. The manner of fastening of the plug protection device is therefore independent of the type and shape of the respective device, of the respective machine and/or of the respective equipment, and merely has to be matched to the sensor. The plug protection device according to the invention can accordingly be offered, distributed and mounted together with the sensor as a sensor arrangement.

The insertion direction of the plug defines merely the orientation of the insertion movement and comprises both the direction for inserting the plug into the connection socket of the sensor and also the opposite direction for withdrawing the plug out from the connection socket of the sensor.

The at least one protection lug can extend, starting from the annular holding section, in insertion direction at least in such an extent that in a mounted arrangement of the plug protection device onto the shoulder of the sensor housing of the sensor, in which the electric plug is also inserted into the electric connection socket of the sensor, the at least one protection lug at least substantially covers and/or projects over an end of the electric plug facing away from the connection socket of the sensor. In this respect, the at least one protection lug can be configured to cover the plug over its substantial or entire longitudinal extent.

The at least one protection lug can extend, starting from the annular holding section, in insertion direction at least to such an extent that in a mounted arrangement of the plug protection device onto the shoulder of the sensor housing of the sensor, in which the electric plug is also inserted into the electric connection socket of the sensor, the at least one protection lug at least substantially covers and/or projects over a strain relief sleeve adjoining the end of the electric plug facing away from the connection socket of the sensor.

In this respect, the at least one protection lug can be configured to cover the plug over its substantial or entire longitudinal extent, including any strain relief sleeve which may be present.

The plug protection device can have at least two protection lugs connected with the annular holding section, which extend away from a face side of the annular holding section, which, in a mounted arrangement of the plug protection device on the shoulder of the sensor housing, faces an electric connection socket of the sensor formed for the contacting reception of an electric plug, in such a manner that the protection lugs extend at a distance from one another and at least substantially parallel to one another in an insertion direction, so that in an arrangement of the plug protection device mounted onto the shoulder of the sensor housing of the sensor, in which the electric plug is also inserted into the electric connection socket of the sensor, the electric plug is limited mechanically on at least two, in particular opposite, sides of the electric plug by the two protection lugs.

The opposite protection lugs can be configured so as to be square or rectangular in cross-section, and in this respect can be configured in the manner of a straight strip. Alternatively, the protection lugs can be configured so as to be arcuate in cross-section, and formed in this respect in the manner of a channel, the concave side wall of which faces the plug.

The protection lugs can extend at a distance from one another and at least substantially parallel to one another in an insertion direction in such a way that the protection lugs delimit two opposite gaps so that, in an arrangement of the plug connection device mounted onto the shoulder of the sensor housing of the sensor, an electric angle plug is optionally able to be inserted in a first orientation into the connection socket of the sensor, in which the angled end section of the angle plug extends radially outwards through the one gap, or is able to be inserted in a second orientation, which in particular is rotated through 120 degrees or 180 degrees with respect to the first orientation, into the connection socket of the sensor, in which the angled end section of the angle plug extends radially outwards through the other gap.

The two, three or, for example, also four protection lugs can respectively delimit a gap in pairs, so that at least one gap or respectively two or for example also three gaps are formed, wherein the gaps can be formed in such a way that an angle plug can then be directed out radially in various rotation positions via respectively one of the gaps.

The inner surface wall can be configured as a circular-cylindrical surface wall and can have an internal diameter which is adapted to an external diameter of a thread section of the sensor housing of the sensor in such a way that the plug protection device, in a mounted arrangement onto the shoulder of the sensor housing of the sensor, lies in a flush manner with the circular-cylindrical surface wall on the thread section of the sensor housing in such a way that the plug protection device is mounted in a form-fitting manner on the sensor housing and can be turned relative to the sensor housing.

The annular holding section can have a skirt section, which is configured, in an arrangement of the plug protection device mounted onto the shoulder of the sensor housing of the sensor, to cover a screw contour of the sensor housing, which is configured for the applying of a screwing tool for screwing the sensor into an equipment housing of an equipment having the sensor and/or for unscrewing the sensor out from the equipment housing.

The screw contour can be, for example, a square profile, a hexagonal profile (analogous to a nut) or an octagonal profile. An open-end spanner for example can be applied to the screw contour or respectively to such an edge profile, in order to be able to screw in the sensor by means of such a hand tool and an external thread pitch, formed on the sensor housing, into a threaded bore of the device, of the machine and/or of the equipment. The screw contour can, however, also be a mere manual actuation surface, such as for example a knurling, by which the sensor can be screwed manually into a threaded bore of the device, of the machine and/or of the equipment.

The problem is solved in addition by a sensor arrangement, having a sensor with a receiver and with a sensor housing, which comprises a substantially cylindrical fastening- and receiver section, a handling section adjoining the cylindrical fastening- and receiver section, and a connection section, with an outer surface wall, stepped in diameter, adjoining the handling section, wherein the connection section has a face side on which an electrical connection socket of the sensor is arranged, and having a plug protection device as according to one or more the described embodiments.

Owing to the simple configuration of the plug protection device according to the invention, this plug protection device can be transported, distributed and/or mounted in a simple manner together with the sensor. A defective or damaged plug protection device can be exchanged easily and quickly.

The inner surface wall of the annular holding section of the plug protection device can have an internal diameter which is greater than an external diameter of the outer surface wall of the shoulder of the sensor housing of the sensor and namely such that in a mounted arrangement of the plug protection device onto the shoulder of the sensor housing of the sensor, between the inner surface wall of the annular holding section and the outer surface wall of the shoulder of the sensor housing of the sensor only a small annular gap is formed in the manner of a clearance fit.

The sensor arrangement can comprise an electric line, which has an electric plug at one line end, wherein the electric connection socket of the sensor is configured for the contacting reception of the electric plug, and in a mounted arrangement of the electric plug inserted into the electric connection socket of the sensor, in which the electric plug is arranged between at least two wall sections of the at least one protection lug, the receiver is connected to the electric line.

The inner surface wall of the annular holding section of the plug protection device can be configured as a circular-cylindrical surface wall, which has an internal diameter which is greater than an external diameter of the outer surface wall of the connection section of the sensor housing, which is configured as a thread section, and namely such that in a mounted arrangement of the plug protection device onto the connection section of the sensor housing, between the inner surface wall of the annular holding section and the outer surface wall of the connection section of the sensor housing, only a small annular gap is formed in the manner of a clearance fit so that, despite a substantially form-fitting mounting, the plug protection device on the sensor, the plug protection device can be turned relative to the sensor about an axially extending rotation axis.

The sensor housing can have a screw contour, in particular an exterior contour, and the annular holding section of the plug protection device can have here a skirt section which is configured, in a mounted arrangement of the plug protection device onto the shoulder of the sensor housing of the sensor, to cover the screw contour, in particular the exterior contour of the sensor housing.

BRIEF DESCRIPTION OF THE DRAWINGS

Various example embodiments of the invention are explained in further detail by way of example in the following description with reference to the enclosed diagrammatic figures. Practical features of these exemplary example embodiments, independently of in which practical context they are mentioned, can, if applicable, also considered individually or in other combinations, represent general features of the invention.

There are shown.

DESCRIPTION OF EXAMPLE EMBODIMENTS

Figure 1:
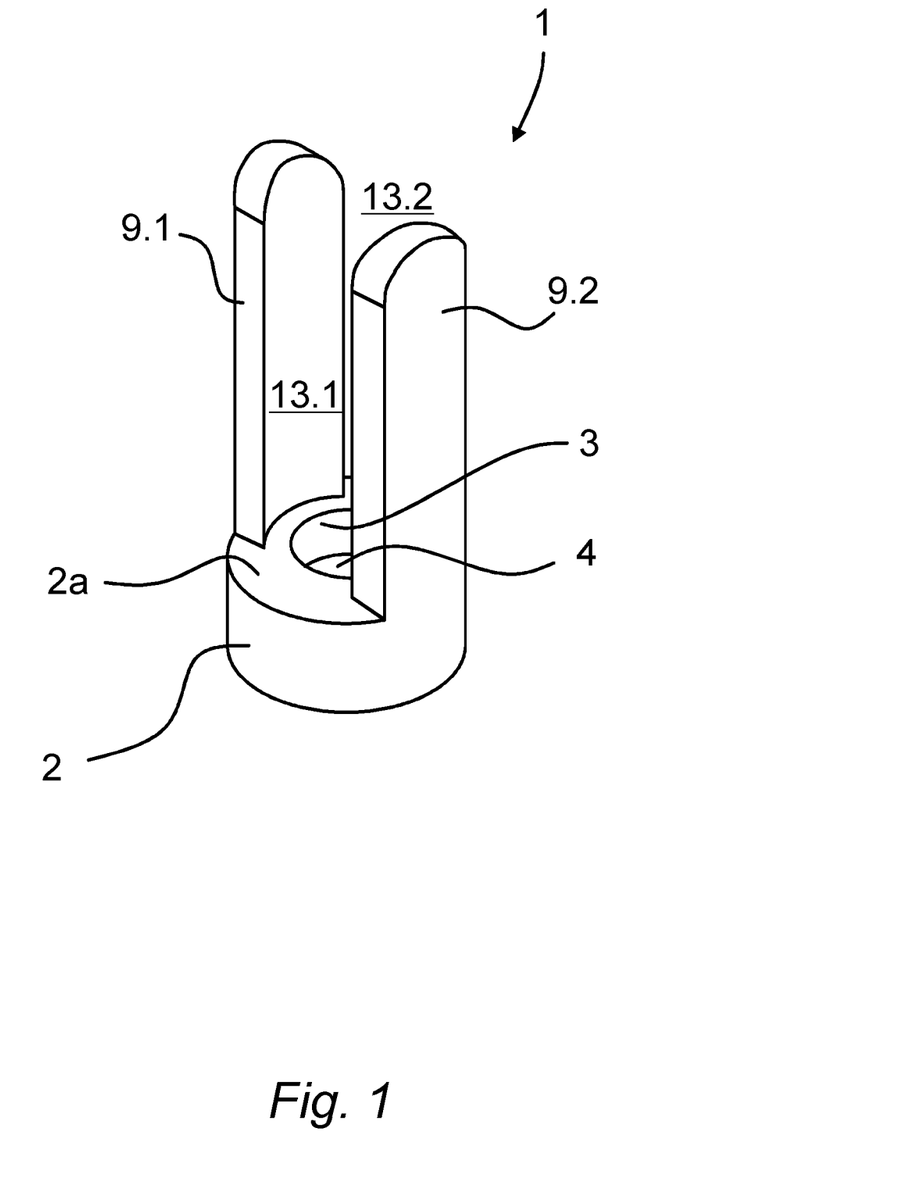
FIG. 1 a perspective illustration of a first embodiment, by way of example, of a plug protection device according to the invention with two protection lugs in isolation, FIG. 2 a sectional illustration of the plug protection device according to FIG. 1, FIG. 3 a perspective illustration of the plug protection device according to FIG. 1 in an arrangement mounted onto a sensor, with a straight plug mounted onto the sensor, FIG. 4 a perspective illustration of the plug protection device according to FIG. 1 in a mounted arrangement onto a sensor, with an angle plug mounted onto the sensor, FIG. 5 a perspective illustration of an equipment, by way of example, which is fitted with a sensor arrangement according to the invention, comprising the sensor, the plug protection device according to FIG. 1 and an angle plug, FIG. 6 a perspective illustration of a second exemplary embodiment of a plug protection device in a mounted arrangement onto the sensor with an angle plug mounted onto the sensor, with three protection lugs, and FIG. 7 a perspective illustration of a third exemplary embodiment of a plug protection device in a mounted arrangement onto the sensor with an angle plug mounted onto the sensor, with only a single protection lug.

FIG. 1 shows a first embodiment of a plug protection device 1.

The plug protection device 1 has an annular holding section 2, which has an inner surface wall 3 which delimits a through-opening 4 of the annular holding section 2.

Figure 2:
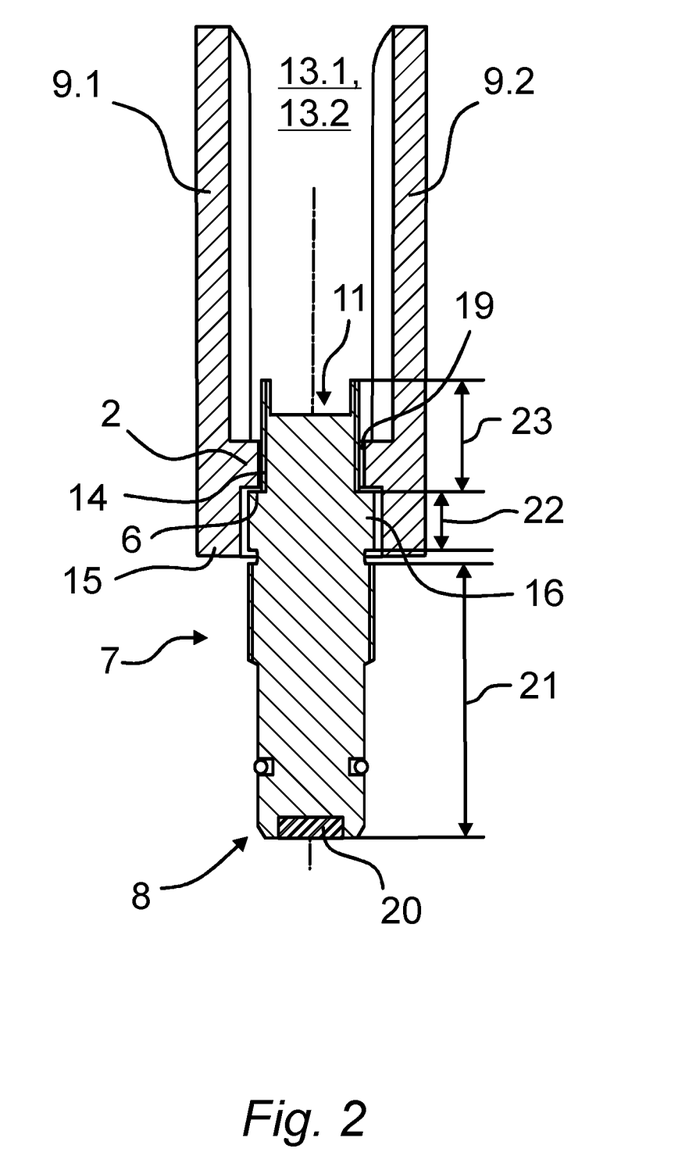

As can be seen from the sectional illustration of FIG. 2, the inner surface wall 3 is adapted with regard to its shape and size to an outer surface wall 5 of a shoulder 6 of a sensor housing 7 of a sensor 8 in such a way that the annular holding section 2 of the plug protection device 1 is able to be mounted in a form-fitting manner onto the shoulder 6 of the sensor housing 7.

Figures 3, 4:
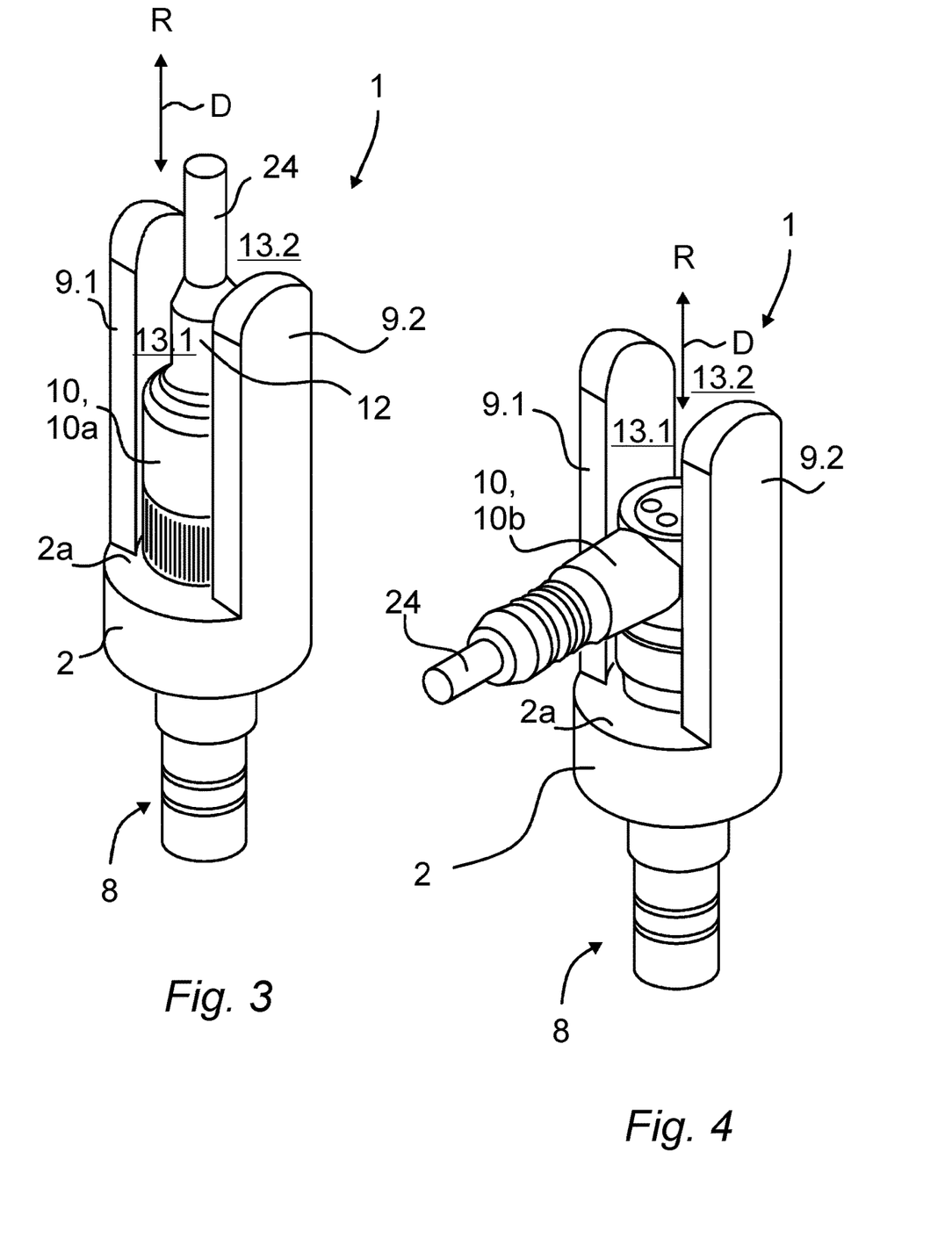

The plug protection device 1 has at least one protection lug connected with the annular holding section 2, in the case of the present first example embodiment precisely two protection lugs 9.1, 9.2, which extends away from a face side 2a of the annular holding section 2, which in a mounted arrangement of the plug protection device 1 on the shoulder 6 of the sensor housing 7, as can be seen in particular in FIG. 3 and FIG. 4, faces an electric connection socket 11 of the sensor 8 configured for the contacting reception of an electric plug 10.

The protection lugs 9.1, 9.2 extend in an insertion direction R in such a way that in a mounted arrangement of the plug protection device 1 onto the shoulder 6 of the sensor housing 7 of the sensor 8, as is shown in particular in FIG. 3 and FIG. 4, in which also the electric plug 10 is inserted into the electric connection socket 112 of the sensor 8, the electric plug 10 is mechanically limited on at least one side of the electric plug 10, in the case of the present first example embodiment on two opposite sides of the electric plug 10, by the two protection lugs 9.1, 9.2.

The at least one protection lug 9.1, 9.2, 9.3 extends, proceeding from the annular holding section 2, in insertion direction R at least to such an extent that in a mounted arrangement of the plug protection device 1 onto the shoulder 6 of the sensor housing 7 of the sensor 8, in which also the electric plug 10 is inserted into the electric connection socket 11 of the sensor, the at least one protection lug 1 at least substantially covers and/or projects over an end of the electric plug 10 facing away from the connection socket 11 of the sensor 8.

The at least one protection lug 9.1, 9.2, 9.3 can, as illustrated in FIG. 3, proceeding from the annular holding section 2, extend in insertion direction R at least to such an extent that in a mounted arrangement of the plug protection device 1 onto the shoulder 6 of the sensor housing 7 of the sensor 8, in which also the electric plug 10 is inserted into the electric connection socket 11 of the sensor 8, the at least one protection lug 9.1, 9.2, 9.3 at least substantially covers and/or projects over a strain relief sleeve 12 adjoining the end of the electric plug 10 facing away from the connection socket 11 of the sensor 8.

In the first embodiment according to FIG. 1 to FIG. 5, the plug protection device 1 has precisely two protection lugs 9.1, 9.2 connected with the annular holding section 2, which extend away from the face side 2a of the annular holding section 2, which in a mounted arrangement of the plug protection device 1 on the shoulder 6 of the sensor housing 6 faces an electric connection socket 11 of the sensor 8 formed for the contacting reception of an electric plug 10, in such a way that the protection lugs 9.1, 9.2 extend at a distance from one another and at least substantially parallel to one another in the insertion direction R, so that in an arrangement of the plug protection device 1 mounted onto the shoulder 6 of the sensor housing 7 of the sensor 8, in which also the electric plug 10 is inserted into the electric connection socket 11 of the sensor 8, the electric plug 10 is mechanically limited on at least two, in particular opposite sides of the electric plug 10 by the two protection lugs 9.1, 9.2.

The plug 10 can be configured in particular as a straight plug 10a (FIG. 3) or as an angle plug 10b (FIG. 4).

The two protection lugs 9.1, 9.2 extend here at a distance from one another and at least substantially parallel to one another in the insertion direction R in such a way that the protection lugs 9.1, 9.2 delimit two opposite gaps 13.1, 13.2, so that in a mounted arrangement of the plug projection device 1 onto the shoulder 6 of the sensor housing 7 of the sensor 8 an electric angle plug 10b is able to be inserted optionally in a first orientation into the connection socket 11 of the sensor 8, in which the angled end section of the angle plug 10b extends radially outwards through the one gap 13.1, or in a second orientation, which is rotated in particular with respect to the first orientation through 120 degrees or 180 degrees, is able to be inserted into the connection socket 11 of the sensor 8, in which the angled end section of the angle plug 10b extends radially outwards through the other gap 13.2.

Figures 6, 7:
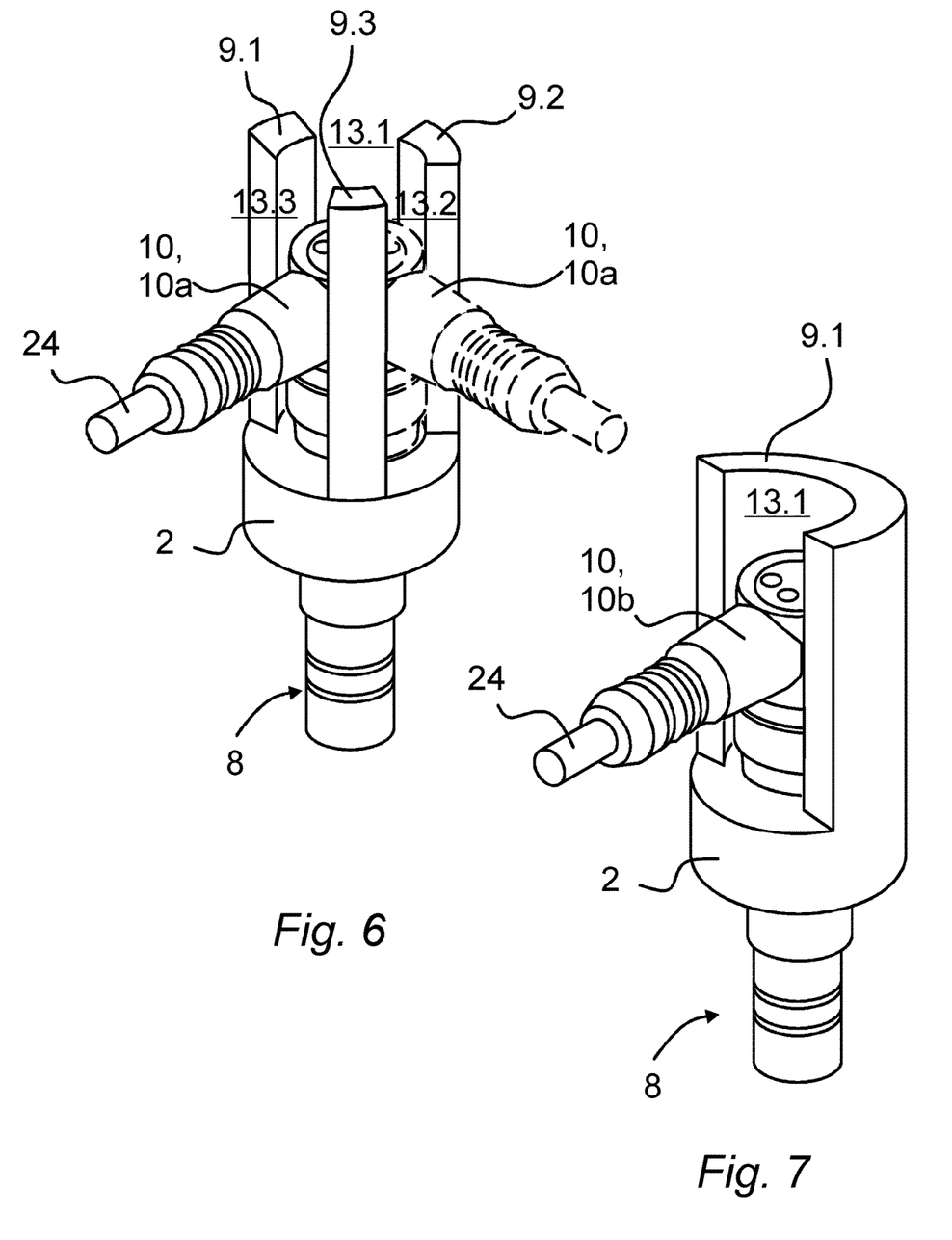

In the second embodiment according to FIG. 6, the plug protection device 1 has precisely three protection lugs 9.1, 9.2, 9.3 connected with the annular holding section 2, which extend away from the face side 2a of the annular holding section 2, which in a mounted arrangement of the plug protection device 1 on the shoulder 6 of the sensor housing 6 faces an electric connection socket 11 of the sensor 8 configured for the contacting reception of an electric plug 10, in such a way that the protection lugs 9.1, 9.2, 9.3 extend at a distance from one another and at least substantially parallel to one another in the insertion direction R, so that in a mounted arrangement of the plug protection device 1 onto the shoulder 6 of the sensor housing 7 of the sensor 8, in which also the electric plug 10 is inserted into the electric connection socket 11 of the sensor 8, the electric plug 10 is mechanically limited on at least three sides of the electric plug 10 by the three protection lugs 9.1, 9.2, 9.3.

The three protection lugs 9.1, 9.2, 9.3 extend here at a distance from one another and at least substantially parallel to one another in the insertion direction R, in such a way that the protection lugs 9.1, 9.2, 9.3 delimit three gaps 13.1, 13.2, 13.3, so that in a mounted arrangement of the plug protection device 1 onto the shoulder 6 of the sensor housing 7 of the sensor 8 an electric angle plug 10b is optionally able to be inserted in a first orientation into the connection socket 11 of the sensor 8 in which the angled end section of the angle plug 10b extends radially outwards through the one gap 13.1, or in a second orientation, which in particular is rotated through 120 degrees with respect to the first orientation, is able to be inserted into the connection socket 11 of the sensor 8 in which the angled end section of the angle plug 10b extends radially outwards through the second gap 13.2, or in a third orientation, which in particular is rotated through 120 degrees with respect to the first orientation, is able to be inserted into the connection socket 11 of the sensor 8, in which the angled end section of the angle plug 10b extends radially outwards through the third gap 13.3.

In the third embodiment according to FIG. 7, the plug protection device 1 has only a single protection lug 9.1 connected with the annular holding section 2, which protection lug extends away from the face side 2a of the annular holding section 2, which in a mounted arrangement of the plug protection device 1 on the shoulder 6 of the sensor housing 6 faces an electric connection socket 11 of the sensor 8 configured for the contacting reception of an electric plug 10, in such a way that the protection lug 9.1 extends in the insertion direction R along its length and fits around the plug 10 here in an arc shape in an arcuate angle of between 90 degrees and 270 degrees, in particular of 180 degrees, so that in a mounted arrangement of the plug protection device 1 onto the shoulder 6 of the sensor housing 7 of the sensor 8, in which the electric plug 10 is inserted into the electric connection socket 11 of the sensor 8, the electric plug 10 is mechanically limited over a partial circumference of the electric plug 10 by the single, arc-shaped protection lug 9.1.

The single protection lug 9.1 extends here at a small distance from the plug in the insertion direction R in such a way that the protection lug 9.1 forms a gap 13.1, so that in a mounted arrangement of the plug protection device 1 onto the shoulder 6 of the sensor housing 7 of the sensor 8 an electric angle plug 10b is able to be inserted exclusively in this one orientation into the connection socket 11 of the sensor 8, in which the angled end section of the angle plug 10b extends radially outwards through this single gap 13.1.

As can be seen in particular from FIG. 1 and FIG. 2, the inner surface wall 3 can be configured as a circular-cylindrical surface wall and can have an internal diameter which is adapted to an external diameter of the thread section 14 of the sensor housing 7 of the sensor 8 in such a way that the plug protection device 1 in a mounted arrangement onto the shoulder 6 of the sensor housing 7 of the sensor 8 (FIG. 2) lies flush with the circular-cylindrical surface wall on the thread section 14 of the sensor housing 7 in such a way that the plug protection device 1 is mounted in a form-fitting manner on the sensor housing 7 and can, however, be rotated relative to the sensor housing 7.

Figure 5:
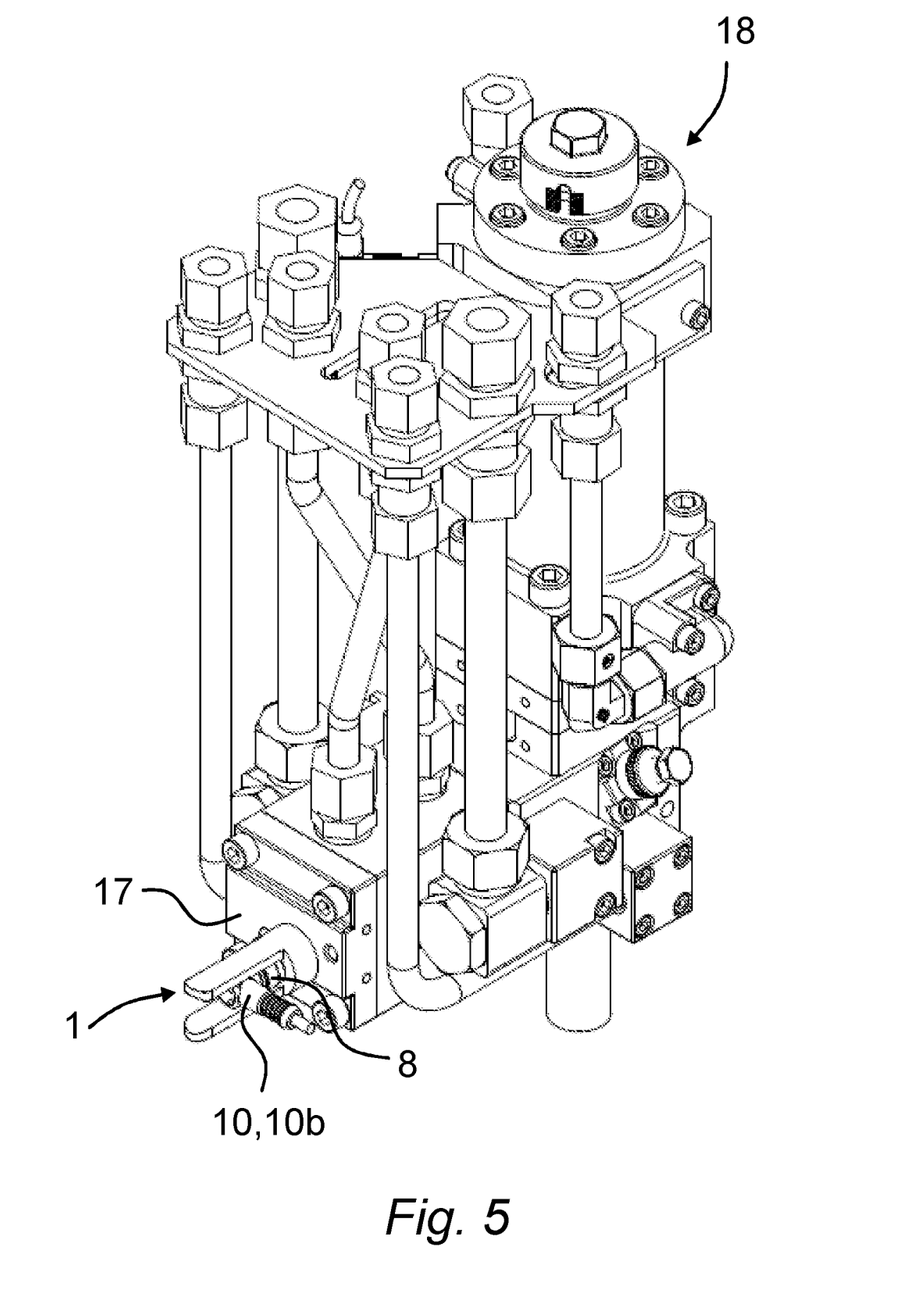

As is illustrated in particular in FIG. 2, the annular holding section 2 can have a skirt section 15, which is configured, in a mounted arrangement of the plug protection device 1 onto the shoulder 6 of the sensor housing 7 of the sensor 8 (FIG. 2) to cover a screw contour 16 of the sensor housing 7, which is configured for the applying of a screw tool for screwing the sensor 8 into an equipment housing 17 of an equipment 18 having the sensor 8, and/or for unscrewing the sensor 8 out from the equipment housing 17 (FIG. 5).

FIG. 3 to FIG. 5 therefore show a sensor arrangement, having the sensor 8 with a receiver 20 and with the sensor housing 7, which comprises a substantially cylindrical fastening- and receiver section 21, a handling section 22 adjoining the cylindrical fastening- and receiver section 21, and a connection section 23, adjoining the handling section 22, reduced in diameter, with an outer surface wall, wherein the connection section 23 has a face side on which the electric connection socket 11 of the sensor 8 is arranged, and having the plug protection device 1 according to one of the described embodiments.

The inner surface wall of the annular holding section 2 of the plug protection device 1 has an internal diameter which is greater than an external diameter of the outer surface wall of the shoulder 6 of the sensor housing 7 of the sensor 8 and namely in such a way that in a mounted arrangement of the plug protection device onto the shoulder 6 of the sensor housing 7 of the sensor 8, as can be seen in particular in FIG. 2, only a small annular gap 19 in the manner of a clearance fit is formed between the inner surface wall of the annular holding section 2 and the outer surface wall of the shoulder 6 of the sensor housing 7 of the sensor 8.

The sensor arrangement comprises an electric line 24, which has at one line end the electric plug 10, wherein the electric connection socket 11 of the sensor 8 is configured for the contacting reception of the electric plug 10, and in an inserted arrangement of the electric plug 10 into the electric connection socket 11 of the sensor 8, in which the electric plug 10 is arranged between at least two wall sections of the at least one protection lug 9.1, 9.2, 9.3, the receiver 20 is connected to the electric line 24.

The inner surface wall of the annular holding section 2 of the plug protection device 1 can, as illustrated, be configured as a circular-cylindrical surface wall, which has an internal diameter which is greater than the external diameter of the outer surface wall of the connection section 23 of the sensor housing 7, which can be configured as a thread section 14, and namely in such a way that in a mounted arrangement of the plug protection device 1 onto the connection section 23 of the sensor housing 7, between the inner surface wall of the annular holding section 2 and the outer surface wall of the connection section 23 of the sensor housing 7 only a small annular gap 19 is formed in the manner of a clearance fit, so that despite a substantially form-fitting mounting, the plug protection device 1 on the sensor 8, the plug protection device 1 can be rotated relative to the sensor 8 about an axially extending rotation axis D (corresponds to insertion direction R).

REFERENCE LIST 1 plug protection device
2 annular holding section 2a face side
3 inner surface wall
4 through-opening
5 outer surface wall
6 shoulder
7 sensor housing
8 sensor
9.1, 9.2, 9.3 protection lugs
10 plug
10a straight plug
10b angle plug
11 connection socket
12 strain relief sleeve
13.1, 13.2, 13.3 gaps
14 thread section
15 skirt section
16 screw contour
17 equipment housing
18 equipment
19 annular gap
20 receiver
21 fastening- and receiver section
22 handling section
23 connection section
24 electric line
D rotation axis
R insertion direction

The invention claimed is:

1. A plug protection device (1), having an annular holding section (2), which has an inner surface wall (3), which delimits a through-opening (4) of the annular holding section (2) and which, with regard to its shape, is adapted to an outer surface wall (5) of a shoulder (6) of a sensor housing (7) of a sensor (8) in such a way that the annular holding section (2) of the plug protection device (1) is able to be mounted in a form-fitting manner onto the shoulder (6) of the sensor housing (7), and having at least one protection lug (9.1, 9.2, 9.3) connected with the annular holding section (2), which extends away from a face side of the annular holding section (2), which in a mounted arrangement of the plug protection device (1) on the shoulder (6) of the sensor housing (7) faces an electric connection socket (11) of the sensor (8) configured for the contacting reception of an electric plug (10), in such a way that the protection lug (9.1, 9.2, 9.3) extends in an insertion direction (R), so that in a mounted arrangement of the plug protection device (1) onto the shoulder (6) of the sensor housing (7) of the sensor (8), in which also the electric plug (10) is inserted into the electric connection socket (11) of the sensor (8), the electric plug (10) is limited mechanically on at least one side of the electric plug (10) by the at least one protection lug (9.1, 9.2, 9.3).

2. The plug protection device (1) according to claim 1, characterized in that the at least one protection lug (9.1, 9.2, 9.3), proceeding from the annular holding section (2), extends in insertion direction (R) at least to such an extent that in a mounted arrangement of the plug protection device (1) onto the shoulder (6) of the sensor housing (7) of the sensor (8), in which also the electric plug (10) is inserted into the electric connection socket (11) of the sensor (8), the at least one protection lug (9.1, 9.2, 9.3) at least substantially covers and/or projects over an end of the electric plug (10) facing away from the connection socket (11) of the sensor (8).

3. The plug protection device (1) according to claim 2, characterized in that the at least one protection lug (9.1, 9.2, 9.3), proceeding from the annular holding section (2), extends in insertion direction (R) at least to such an extent that in a mounted arrangement of the plug protection device (1) onto the shoulder (6) of the sensor housing (7) of the sensor (8), in which also the electric plug (10) is inserted into the electric connection socket (11) of the sensor (8), the at least one protection lug (9.1, 9.2, 9.3) at least substantially covers and/or projects over a strain relief sleeve (12) adjoining at the end of the electric plug (10) facing away from the connection socket (11) of the sensor (8).

4. The plug protection device (1) according to claim 1, having at least two protection lugs (9.1, 9.2, 9.3) connected with the annular holding section (2), which extend away from a face side of the annular holding section (2), which in a mounted arrangement of the plug protection device (1) on the shoulder (6) of the sensor housing (7) faces an electric connection socket (11) of the sensor (8) configured for the contacting reception of an electric plug (10), in such a way that the protection lugs (9.1, 9.2, 9.3) extend at a distance from one another and at least substantially parallel to one another in an insertion direction (R), so that in a mounted arrangement of the plug protection device (1) onto the shoulder (6) of the sensor housing (7) of the sensor (8), in which also the electric plug (10) is inserted into the electric connection socket (11) of the sensor (8), the electric plug (10) is mechanically limited on at least two, in particular opposite sides of the electric plug (10) by the two protection lugs (9.1, 9.2, 9.3).

5. The plug protection device (1) according to claim 4, characterized in that the protection lugs (9.1, 9.2, 9.3) extend at a distance from one another and at least substantially parallel to one another in an insertion direction (R) in such a way that the protection lugs (9.1, 9.2, 9.3) delimit two opposite gaps (13.1, 13.2, 13.3), so that in a mounted arrangement of the plug protection device (1) onto the shoulder (6) of the sensor housing (7) of the sensor (8) an electric angle plug (10b) is able to be inserted optionally in a first orientation into the connection socket (11) of the sensor (8), in which the angled end section of the angle plug (10b) extends radially outwards through the one gap (13.1, 13.2, 13.3) or in a second orientation, which is rotated in particular with respect to the first orientation through 120 degrees or 180 degrees, is able to be inserted into the connection socket (11) of the sensor (8) in which the angled end section of the angle plug (10b) extends radially outwards through the other gap (13.1, 13.2, 13.3).

6. The plug connection device (1) according to claim 1, characterized in that the inner surface wall (3) is configured as a circular-cylindrical surface wall and has an internal diameter which is adapted to an external diameter of a thread section (14) of the sensor housing (7) of the sensor (8) in such a way that the plug protection device (1) in a mounted arrangement onto the shoulder (6) of the sensor housing (7) of the sensor (8) lies flush with the circular-cylindrical surface wall on the thread section (14) of the sensor housing (7) in such a way that the plug protection device (1) is mounted in a form-fitting manner on the sensor housing (7) and can be rotated relative to the sensor housing (7).

7. The plug protection device (1) according to claim 1, characterized in that the annular holding section (2) has a skirt section (15) which is configured, in a mounted arrangement of the plug protection device (1) onto the shoulder (6) of the sensor housing (7) of the sensor (8), to cover a screw contour (16) of the sensor housing (7), which is configured for the applying of a screwing tool for screwing the sensor (8) into an equipment housing (17) of an equipment (18) having the sensor (8), and/or for unscrewing the sensor (8) out from the equipment housing (17).

8. A sensor arrangement comprising the plug protection device (1) according to claim 1, having a sensor (8) with a receiver (20) and with a sensor housing (7), which comprises a substantially cylindrical fastening- and receiver section (21), a handling section (22) adjoining the cylindrical fastening- and receiver section (21), and a connection section (23), reduced in diameter, adjoining the handling section (22), with an outer surface wall, wherein the connection section (23) has a face side on which an electric connection socket (11) of the sensor (8) is arranged.

9. The sensor arrangement according to claim 8, characterized in that the inner surface wall (3) of the annular holding section (2) of the plug protection device (1) has an internal diameter which is greater than an external diameter of the outer surface wall (5) of the shoulder (6) of the sensor housing (7) of the sensor (8) and namely in such a way that in a mounted arrangement of the plug protection device (1) onto the shoulder (6) of the sensor housing (7) of the sensor (8), between the inner surface wall (3) of the annular holding section (2) and the outer surface wall (5) of the shoulder (6) of the sensor housing (7) of the sensor (8) only a small annular gap (19) is formed in the manner of a clearance fit.

10. The sensor arrangement according to claim 8, characterized in that the sensor arrangement comprises an electric line (24), which has at one line end an electric plug (10), wherein the electric connection socket (11) of the sensor (8) is configured for the contacting reception of the electric plug (10), and in an inserted arrangement of the electric plug (10) into the electric connection socket (11) of the sensor (8), in which the electric plug (10) is arranged between at least two wall sections of the at least one protection lug (9.1, 9.2, 9.3), the receiver (20) is connected to the electric line (24).

11. The sensor arrangement according to claim 8, characterized in that the inner surface wall (3) of the annular holding section (2) of the plug protection device (1) is configured as a circular-cylindrical surface wall, which has an internal diameter which is greater than an external diameter of the outer surface wall (5) of the connection section (23) of the sensor housing (7), which is configured as a thread section (14), and namely in such a way that in a mounted arrangement of the plug protection device (1) onto the connection section (23) of the sensor housing (7), between the inner surface wall (3) of the annular holding section (2) and the outer surface wall (5) of the connection section (23) of the sensor housing (7) only a small annular gap (19) is formed in the manner of a clearance fit, so that despite a substantially form-fitting mounting, the plug protection device (1) on the sensor (8), the plug protection device (1) can be rotated relative to the sensor (8) about an axially extending rotation axis (D).

12. The sensor arrangement according to claim 8, characterized in that the sensor housing (7) has a screw contour (16), in particular has an exterior hexagon contour, and the annular holding section (2) of the plug protection device (1) has a skirt section (15), which is configured, in a mounted arrangement of the plug protection device (1) onto the shoulder (6) of the sensor housing (7) of the sensor (8), to cover the screw contour (16), in particular the exterior hexagon contour of the sensor housing (7).

* * * * *